United States Patent [19]

Katoh et al.

[11] 4,070,067
[45] Jan. 24, 1978

[54] FLUID PRESSURE CONTROL DEVICE

[75] Inventors: Sadao Katoh; Tsuneo Kouno, both of Yokosuka, Japan

[73] Assignee: Nissan Motor Co., Ltd., Yokohama, Japan

[21] Appl. No.: 670,593

[22] Filed: Mar. 26, 1976

[30] Foreign Application Priority Data

Mar. 28, 1975 Japan .................................. 50-40881

[51] Int. Cl.² ............................................. B60T 13/06
[52] U.S. Cl. ................................... 303/6 C; 303/24 C
[58] Field of Search ................. 303/6 C, 22 R, 24 R, 303/24 A, 24 C, 24 F; 188/195, 349; 137/519.5

[56] References Cited

U.S. PATENT DOCUMENTS

| | | | |
|---|---|---|---|
| 2,242,297 | 5/1941 | Freeman | 303/6 C |
| 3,087,761 | 4/1963 | Stelzer | 303/24 F |
| 3,143,125 | 8/1964 | Stelzer | 303/6 C |
| 3,252,740 | 5/1966 | Stelzer | 303/24 F |
| 3,385,308 | 5/1968 | Farr | 303/6 C |
| 3,825,303 | 7/1974 | Yabuta | 303/24 C |
| 3,922,020 | 11/1975 | Koike et al. | 303/6 C |

Primary Examiner—Trygve M. Blix
Assistant Examiner—Edward R. Kazenske
Attorney, Agent, or Firm—Lowe, King, Price & Markva

[57] ABSTRACT

A ball valve supporter is fixedly attached to an internal wall of a bore formed in an end plug of a fluid pressure control device. The valve supporter lacks an aperture which penetrates the supporter and opens into a ball valve chamber from the supporter at a portion confronting the ball valve. The valve supporter is formed outside the portion confronting the ball valve with passage means opening into the ball valve chamber.

5 Claims, 6 Drawing Figures

FLUID PRESSURE CONTROL DEVICE

BACKGROUND OF THE INVENTION

The present invention relates generally to a braking pressure control device which regulates the output fluid pressure for the wheel cylinders of the motor vehicle to increase at the same rate as the input fluid pressure from the master cylinder when the input fluid pressure is below a critical fluid pressure. The regulation provides an increase at a rate smaller than the rate of increase in the input fluid pressure when the input fluid pressure is above the critical fluid pressure. Further, the critical fluid pressure is varied in accordance with variation in the weight of the motor vehicle. More particularly, the invention relates to an improved braking pressure control device of this type including barrier means for preventing the flow of the input fluid pressure from striking the inertia responsive movable ball valve and exerting thereon a thrust or dynamic pressure which would move the valve to the valve seat to close the port thereof. The barrier means causes the input fluid pressure to flow through the surroundings of the valve to the valve seat.

As is well known in the art, usual motor vehicle hydraulic braking systems are such that the brakes are applied to the front and rear wheels concurrently. In this instance, if an excess amount of braking force is applied to the front wheels, the front wheels are locked earlier than the rear wheels to make it impossible for the driver to handle the motor vehicle. On the contrary, if the rear wheels are braked excessively, they are locked prior to the front wheels to cause the rear portion of the motor vehicle to swing transversely to the longitudinal direction thereof. Accordingly, in order to assure and increase the safety and stability of the vehicle during the braking operation, it is necessary to effect the distribution of the braking forces to lock the front and rear wheels concurrently.

When the vehicle is braked, the so-called nosedive phenomenon takes place in which the vehicle weight applied on the front wheels increases and the vehicle weight applied on the rear wheels decreases. Accordingly, it is necessary for concurrently locking the front and rear wheels to distribute to the front wheels a braking force greater than a braking force distributed to the rear wheels. It is also necessary that the distribution of the braking forces to the front and rear wheels is varied in accordance with variation in the vehicle weight. Thus, ideal characteristics of distribution of the braking forces to the front and rear wheels, when are illustrated on oblique coordinates having the axes of abscissa and ordinate indicating respectively thereon the ratios (deceleration rate ratios) $Bf/W$ and $Br/W$ of the braking forces $Bf$ and $Br$ on the front and rear wheels versus the vehicle weight W, are expressed by curves having tangents the angles of inclination of which are relatively large within a range of the origin to a certain value and are relatively small outside the range. Furthermore, the heavier the vehicle weight is, the higher the ideal characteristics curve is located on the coordinates.

It is accordingly necessary for providing the distribution of the braking forces which is close to the ideal characteristics curve to feed to the rear wheel cylinders a fluid pressure increasing at a rate smaller than that of increase in a fluid pressure fed to the front wheel cylinders or at a rate of zero when the fluid pressure fed to the front wheel cylinders exceeds a predetermined or critical fluid pressure. As an expedient for solving the problem, a limiting valve, proportioning valve or G valve was disposed in a rear braking circuit leading to the rear wheel cylinders. The limiting valve generates an output fluid pressure increasing at a rate of zero when an input fluid pressure exceeds a critical fluid pressure. The proportioning valve generates an output fluid pressure increasing at a rate lower than that of increase in an input fluid pressure when the input fluid pressure exceeds a critical fluid pressure. The G valve generates an output fluid pressure increasing at a rate less than an input fluid pressure when a predetermined rate of deceleration is attained. However, the output fluid pressure generated by these valves merely carried out the distribution of the braking forces approximating to a single ideal characteristics curve which accordingly, corresponds to a predetermined vehicle weight and, when the vehicle weight is varied, effected a distribution of the braking forces which largely deviated from an ideal characteristics curve corresponding to the vehicle weight varied.

On the other hand, most motor vehicles are in recent years provided with a hydraulic braking system of the tandem type which comprises front and rear braking circuits leading respectively separately to the front and rear wheel cylinders. However, a braking pressure control valve which is disposed in the rear braking circuit generated the same output fluid pressure as in the event of no failure of the fluid pressure in the front braking circuit in the event of the failure of the fluid pressure in the front braking circuit and as a result caused the deficiency of the braking force.

Thus, the applicants have proposed a braking pressure control device comprising a fluid pressure regulating valve serving as a proportioning valve or limiting valve, biasing means which urges the fluid pressure regulating valve and to which the master cylinder fluid pressure is fed to control the force of the biasing means, and an inertia responsive movable ball valve responsive to a predetermined rate of deceleration. The ball valve closes the path of flow of the fluid pressure to the biasing means to maintain the fluid pressure having been fed to the biasing means at a predetermined value. Consequently, the critical fluid pressure is varied in accordance with variation in the vehicle weight to generate the output fluid pressure which provides the distributions of the braking forces which approximate to the ideal characteristics curves corresponding to the vehicle weight varied. The fluid pressure regulating valve is also biased by the fluid pressure in the front braking circuit in a direction opposite to the biasing direction by the biasing means. Thus, in the event of the failure of the fluid pressure in the front braking circuit, the critical fluid pressure is sufficiently increased to generate the output fluid pressure high to compensate the deficiency of the braking force.

However, the conventional braking pressure control device has had a drawback in that support means for supporting the ball valve is formed through its central end portion with an aperture for passing the master cylinder fluid pressure to the biasing means. Therefore, the flow of the fluid pressure strikes the ball valve to exert a thrust thereon. The thrust moves the ball valve into a position to close an inlet port to the biasing means to hinder the braking pressure control device from exhibiting its desired function completely.

SUMMARY OF THE INVENTION

It is, therefore, an object of the invention to provide an improved braking pressure control device in which the flow of the master cylinder fluid pressure is prevented from striking the ball valve. Consequently, a thrust is not produced and does not move the ball valve into a position to close an inlet port to the biasing means. Thus, the braking pressure control device exhibits its desired function completely. The control device includes barrier support means for supporting the ball valve. The barrier support means lacks an aperture penetrating its central end portion to thereby prevent the master cylinder fluid pressure from passing therethrough. Flow of the fluid pressure is diverted to the periphery of the barrier means through passage means formed between the periphery of the barrier means and the ball valve. The fluid pressure diverted by the barrier means and through the passage means passes on to the biasing means.

BRIEF DESCRIPTION OF DRAWINGS

This and other objects and advantages of the invention will become more apparent from the following detailed description taken in connection with the accompanying drawings in which.

DESCRIPTION OF SPECIFIC EMBODIMENTS

Figure 1:
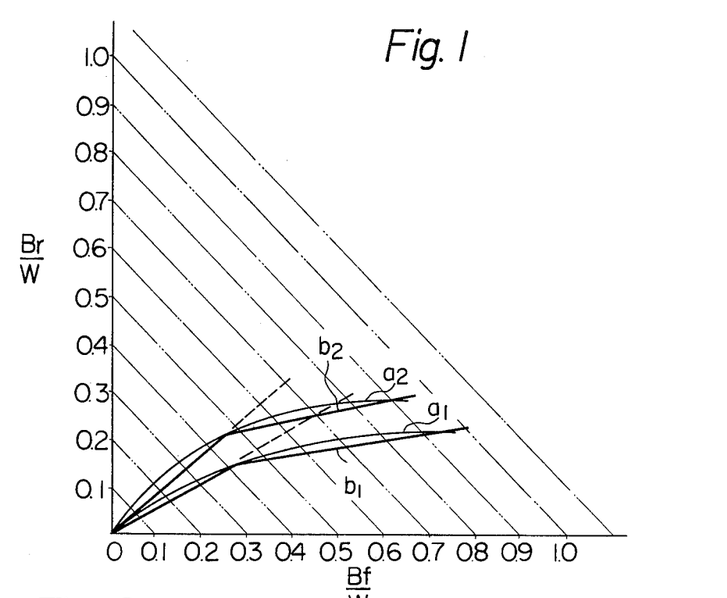
FIG. 1 is a graphic representation of the ideal characteristics curves of the distribution of the braking forces to the front and rear wheels.

Referring to FIG. 1 of the drawings, the ideal characteristics curves $a_1$ and $a_2$ as per the introduction of the specification of the distribution of the braking forces to the front and rear wheels are illustrated on oblique coordinates having the axes of abscissa and ordinate indicating respectively thereon the ratios (deceleration rate ratios) $Bf/W$ and $Br/W$ of the braking forces $Bf$ and $Br$ on the front and rear wheels versus the vehicle weight W. The curves $a_1$ and $a_2$ are the ideal characteristics curves at the time when the weight of the vehicle is $W_1$ (no load) and $W_2$ (the vehicle carries load), respectively. Generally, the heavier the vehicle weight is, the higher or the more the ideal characteristics curve is positioned or extends steeply from the origin O in the graph of FIG. 1.

As is apparent from the graph, the angle of inclination of a tangent of each of the curves $a_1$ and $a_2$ is relatively large within a range of the origin O to a certain value and is relatively small outside the range. In the graph of FIG. 1, there is also illustrated the characteristics lines $b_1$ and $b_2$ of the distribution of the braking forces to the front and rear wheels which distribution is provided to approximate respectively to the ideal characteristics curves $a_1$ and $a_2$ by a motor vehicle hydraulic braking system incorporating therein a braking pressure control device according to the invention.

Figure 2:
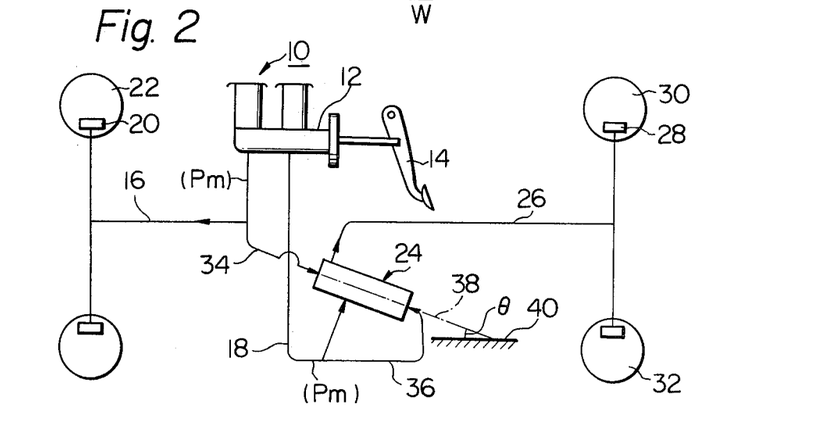
FIG. 2 is a schematic view of a motor vehicle hydraulic braking system incorporating thereinto a braking pressure control device according to the invention.

Referring to FIG. 2 of the drawings, there is shown a motor vehicle hydraulic braking system incorporating therein a braking pressure control device or valve according to the invention. The hydraulic braking system, generally designated by the reference numeral 10, includes a master cylinder 12 operated from a brake pedal 14. First and second hydraulic fluid circuits 16 and 18 lead from the master cylinder 12. The first fluid line 16 is connected to front wheel cylinders 20 cooperating with brakes (not shown) of front wheels 22 of a motor vehicle. The second fluid line 18 is connected to the control device, generally designated 24, which is connected through a fluid line 26 to rear wheel cylinders 28 cooperating with brakes (not shown) of rear wheels 30 and 32 of the vehicle. The first and second fluid lines 16 and 18 are further connected to the control device 24 through branch lines 34 and 36, respectively. The control valve 24 is mounted on the body (not shown) of the vehicle to have its axis 38 inclined at an angle of $\theta$ from the horizontal plane 40 so that the forward end portion of the control valve 24 is positioned above the rearward end portion thereof.

Figure 3:
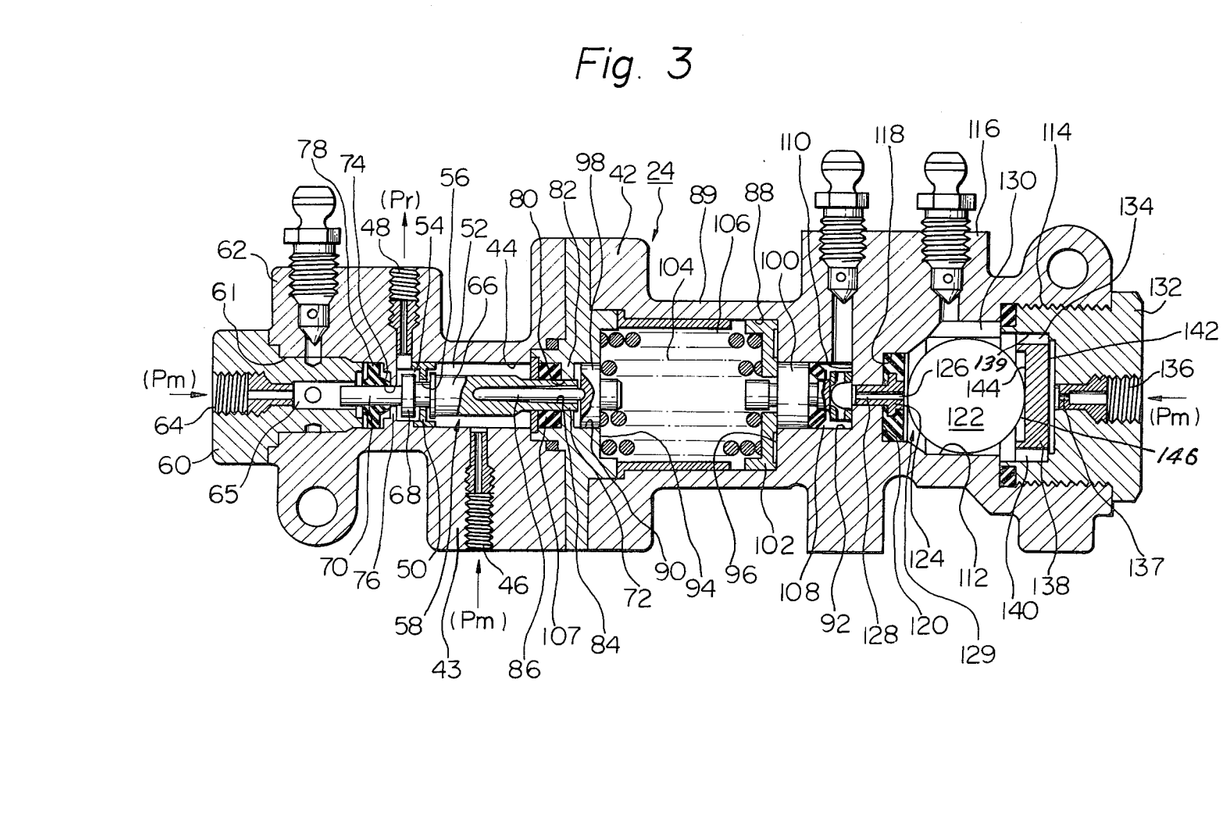
FIG. 3 is a schematic cross sectional view of a preferred embodiment of a braking pressure control device according to the invention.

Referring to FIG. 3 of the drawings, the detailed construction of the braking pressure control valve 24 according to the invention is shown. The control valve 24 comprises a housing 42 having a first cavity 44 and inlet and outlet ports 46 and 48 which are formed in its front portion 43. The inlet and outlet ports 46 and 48 are connected respectively to the second fluid line 18 and the fluid line 26. An annular sealing member 50 such as a lip type seal is fixedly attached to a wall defining the cavity 44 and divides the same into first and second chambers 52 and 54 into which the inlet and outlet ports 46 and 48 open, respectively. The annular sealing member 50 has formed therethrough an aperture 56. A plunger 58 extends through the aperture 56 and is axially movable in the first and second chambers 52 and 54. The aperture 56 provides an annular clearance between the annular sealing member 50 and the plunger 58 to provide fluid communication between the first and second chambers 52 and 54. A plug member 60 is firmly fitted in a bore 61 formed in the forward end portion 62 of the housing 42 and closes the forward end portion 62. The plug member 60 has formed therein an inlet port 64 connected to the branch line 34 of the first fluid circuit 16, and a bore 65 communicating with the port 64. The plunger 58 has a stem portion 66 located in the first chamber 52, an annular projection 68 having a cross sectional area of $A_1$, and forward and rearward end portions 70 and 72 having cross sectional areas of $A_2$ and $A_3$, respectively, both of which are smaller than $A_1$. The annular projection 68 is located in the second chamber 54 and is engageable with the annular sealing member 50 to obstruct fluid communication between the first and second chambers 52 and 54. The forward end portion 70 is connected to the annular projection 68 and is slidably supported in an aperture 74 formed through the forward end wall 76 of the cavity 44 and extends into the bore 65 of the closure member 60 through the aperture 74. The bore 65 is sealed from the second chamber 54 by a seal member 78. The rearward end portion 72 is connected to the stem portion 66 and is slidably supported in an aperture 80 formed through a rearward end wall 82 of the cavity 44. The rearward end portion 72 is formed therein with a blind bore 84 in which a push rod 86 is received.

The housing 42 further has a second cavity 88 formed in its mid portion 89, and two opposite bores 90 and 92 formed in opposite end walls 94 and 96 of the cavity 88 and both opening into the cavity 88. Two pistons 98 and 100 are slidably fitted in the bores 90 and 92, respectively. The push rod 86 extends from the bore 84 of the plunger 58 into the bore 90 and engages the plunger seat 98. A spring seat 102 is slidably fitted in the cavity 88 and is in abutting engagement with the end wall 96 or the piston 100. An inner compression spring 104 is located between the piston 98 and the spring seat 102 to urge these two members in opposite directions. An outer compression spring 106 is located between the end wall 94 and the spring seat 102 to urge the latter against the end wall 96 or the piston 100. The piston 100 has a cross sectional area of $A_4$. The bore 90 is sealed from the first chamber 52 by a seal member 107. A chamber 108 is defined in the bore 92 between the piston 100 and an end wall 110 of the bore 92.

Figures 4, 5:
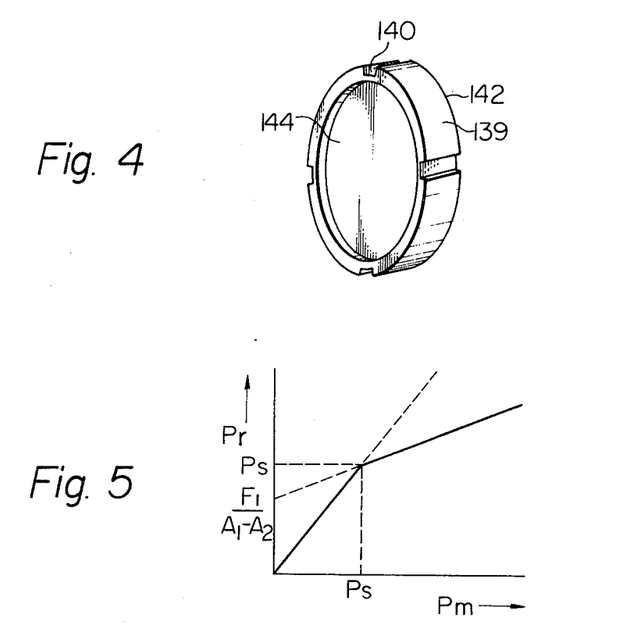
FIG. 4 is a schematic perspective view of barrier support means forming part of the braking pressure control device shown in FIG. 3.
FIG. 5 is a graphic representation of the relationship between the input fluid pressure and the output fluid pressure of the braking pressure control device shown in FIG. 3.

The housing 42 further has a third cavity 112 and a bore 114 which are formed in its rearward end portion 116, and a bore 118 formed in an end wall 120 of the cavity 112. The bore 114 communicates with cavity 112 and has an open end. An inertia responsive movable ball member 122 is rotatably or rollably fitted in the cavity 112. A valve seat member 124 is firmly fitted in the bore 118 and has formed therethrough an aperture 126 opening into the cavity 112 and communicating with the chamber 108 through a passage 128. The ball member 122 constitutes an inertia responsive valve 129 together with the seat member 124 and is seated on the valve seat 124 in response to a predetermined rate of deceleration or inertia force to obstruct fluid communication between the chamber 108 and the inlet port 136. The cavity 112 has a groove 130 formed around the ball member 122. An end plug member 132 is threaded in the bore 114 to close the open end of bore 114. Plug member 132 includes a bore 134 opening into cavity 112 and an inlet port 136 communicating with the bore 134 through an orifice 137 and connected to the branch 36 of the second fluid circuit 18. A ball support member or valve supporter 138 is press fitted in the bore 134 or is fixedly attached to an internal wall of bore 134, unmovably relative to end plug 132. Valve supporter 138 is formed in its circumferential surface 139 or outside a portion confronting ball valve 122 with an axial groove or grooves 140 as shown in FIG. 4 of the drawings which communicates with the inlet port 136. The ball support member 138 is not formed at the portion confronting ball valve 122 with an aperture passing from its outer end 142 to its inner end 144. However, groove 140 provides fluid communication between the groove 130 and the inlet port 136 to cause the pressurized hydraulic fluid from the inlet port 136 to flow into the aperture 126 through the grooves 130 and 140. Thus, flow of the hydraulic fluid is prevented from striking the ball member 122 and from exerting thereon a thrust which moves the ball member 122 into a position to close the valve seat member 124. It is preferable that the ball support member 138 is formed in the outer end 142 with radial grooves (not shown) leading to the grooves 140 for preventing or minimizing pressure loss of the hydraulic fluid from the inlet port 136.

The braking pressure control device 24 thus far described is operated as follows:

When the brake pedal 14 is depressed, the master cylinder 12 delivers a hydraulic fluid pressure $Pm$ into the first and second fluid lines 16 and 18. The fluid pressure $Pm$ in the first fluid line 16 is fed into the front wheel cylinders 20 and through the inlet port 64 into the bore 65 of the pressure control valve 24. The fluid pressure $Pm$ in the second fluid line 18 is fed into the first chamber 52 of the pressure control valve 24 through the inlet port 46 and is then delivered into the second chamber 54 through the aperture 56 of the annular sealing member 50 as an outlet hydraulic fluid pressure $Pr$ which has been modulated or unmodulated. The outlet fluid pressure $Pr$ in the second chamber 54 is fed into the rear wheel cylinders 28 through the outlet port 48. The fluid pressure $Pm$ in the second fluid circuit 18 is also fed into the chamber 108 of the pressure control valve 24 through the inlet port 136, the grooves 140 and 130, and the aperture 126 of the seat member 124.

When the inlet fluid pressure $Pm$ is less than a critical fluid pressure $Ps$, the outlet fluid pressure $Pr$ in the second chamber 54 is equal to the inlet fluid pressure $Pm$, that is, $$Pr = Pm$$

In this condition, the fluid pressure $Pm$ in the bore 65 exerts on the forward end portion 70 of the plunger 58 a force $Pm \times A_2$ which urges the plunger 58 rearwardly. When the inlet fluid pressure $Pm$ is increased to the critical fluid pressure $Ps$, the force $Ps \times A_2$ exceeds the force $F_1$ of the inner spring 104 to move the plunger 58 into a closed position in which the annular projection 68 engages or is pressed against the annular sealing member 50 to obstruct fluid communication between the first and second chambers 52 and 54. At this time, the following relation is defined:

$$Ps \times A_2 = F_1$$

Accordingly, the critical fluid pressure $Ps$ is expressed as $$Ps = F_1/A_2 \qquad \text{Eq. 1}$$

In this instance, since the displacement of the plunger 58 is extremely small, an increase in the force of the spring 104 is so little as to be neglected.

When the input fluid pressure $Pm$ is subsequently further increased, the fluid pressure $Pm$ in the first chamber 52 exerts on the annular projection 68 a force which urges the plunger 58 into an open position to unseat the annular projection 68 from the annular sealing member 50. When the annular projection 68 is unseated from the annular sealing member 50, the fluid pressure $Pm$ in the first chamber 52 is allowed to flow into the second chamber 54 to cause an increase in the output fluid pressure $Pr$. At this time, i.e., when $Pm \geq Ps$, the following equilibrium equation is established:

$$PmA_2 + Pr(A_1 - A_2) = Pm(A_1 - A_3) + F_1 \qquad \text{Eq. 2}$$

Accordingly, the output fluid pressure $Pr$ is expressed as $$Pr = \frac{A_1 - A_3 - A_2}{A_1 - A_2} Pm + \frac{F_1}{A_1 - A_2} \qquad \text{Eq. 3}$$

The output fluid pressure $Pr$ delivered from the outlet port 48 under the control of the braking pressure control valve 24 is in this manner given by either of the Equations 1 and 3 in accordance with the valve of the input fluid pressure $Pm$. Thus, when the input fluid pressure $Pm$ increases from zero, the output fluid pressure $Pr$ increases at the same rate as the input fluid pressure $Pm$ until the input fluid pressure $Pm$ reaches the critical fluid pressure $Ps$. When the input fluid pressure $Pm$ increases above the critical fluid pressure $Ps$, the output fluid pressure $Pr$ increases at the rate of $m$ [wherein $m = (A_1-A_3-A_2)/(A_1-A_2)$] which is smaller than the rate of increase in the input fluid pressure $Pm$.

On the other hand, when the braking force B on the wheels increases with increases in the input fluid pressure $Pm$, the ratio of the rate a of deceleration versus a gravitational acceleration g also increases. This deceleration rate ratio $a/g$ is equal to the ratio of the braking force B versus the overall weight W of the motor vehicle as follows:

$$a/g = B/W \qquad \text{Eq. 4}$$

The braking force B is proportional to the input fluid pressure Pm as follows:

$$B = CPm \text{ (wherein } C \text{ is a constant)} \qquad \text{Eq. 5}$$

When the deceleration rate ratio $a/g$ reaches a predetermined value of $(a/g)_\theta$ which is a function $f(\theta)$ of the angle $\theta$ of inclination of the pressure control valve 24, the ball member 122 of the inertia responsive valve 129 rolls forwardly in response to the force of inertia to seat on the valve seat member 124 to close the aperture 126 to obstruct fluid communication between the chamber 108 and the inlet port 136. Thus, even if the inlet fluid pressure $Pm$ subsequently increases, the fluid pressure in the chamber 108 is maintained at a fluid pressure $Pg$ which is the input fluid pressure $Pm$ at the moment when the aperture 126 of the seat member 124 has been closed by the ball member 122. The fluid pressure $Pg$ is expressed from the Eqs. 4 and 5 and the Eq. 6 [$(a/g)_\theta = f(\theta)$] as $$Pg = \frac{W}{C} f(\theta) \qquad \text{Eq. 7}$$

At this time, from the condition of equilibrium of the piston 100 and the Eq. 7 the following equation is obtained:

$$F_1 + F_2 = Pg \cdot A_4$$
$$= \frac{f(\theta)}{C} A_4 \cdot W \qquad \text{Eq. 8}$$

where $F_2$ is the force of the outer spring 106.

The forces $F_1$ and $F_2$ of the inner and outer springs 104 and 106 are expressed respectively as the sums of the amounts $f_1$ and $f_2$ of preset or initial loads of the springs 104 and 106 and the products of the amounts of deflection or shrinkage of the springs 104 and 106 by a compressive force from the piston 100 and the spring constants $K_1$ and $K_2$ of the springs 104 and 106. In this instance, since the amounts of deflection of the springs 104 and 106 are equal to each other, the following equation is obtained:

$$F_2 = f_2 + \frac{K_2}{K_1}(F_1 - f_1) \qquad \text{Eq. 9}$$

From the Eqs. 8 and 9, the force $F_1$ of the spring 104 is obtained as $$F_1 = \frac{\frac{f(\theta)}{C} A_4 W - (f_2 - \frac{K_2}{K_1} f_1)}{1 + \frac{K_2}{K_1}} \qquad \text{Eq. 10}$$

Substitution of the Eq. 10 into the Eqs. 1 and 3 results in $$Ps = \frac{\frac{f(\theta)}{C} A_4 W - (f_2 - \frac{K_2}{K_1} f_1)}{A_3 (1 + \frac{K_2}{K_1})} \qquad \text{Eq. 11}$$

When $Pm \geq Ps$ $$Pr = mPm + \frac{F_1}{A_1 - A_2}$$
$$= mPm + \frac{\frac{f(\theta)}{C} A_4 W - (f_2 - \frac{K_2}{K_1} f_1)}{(A_1 - A_2)(1 + \frac{K_2}{K_1})}$$

Figure 6:
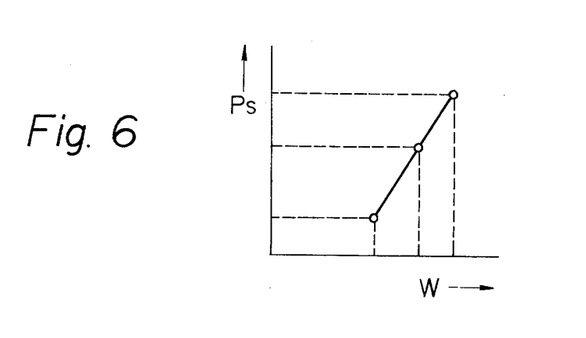
FIG. 6 is a graphic representation of the relationship between the critical fluid pressure of the braking pressure control device shown in FIG. 3 and the vehicle weight.

It is apparent from the Eq. 11 that by selecting the variables in the Eq. 11 in a manner to make the value of $(f_2 - f_1 \cdot K_2/K_1)$ positive, a relation between the critical fluid pressure $Ps$ and the overall vehicle weight W as shown in FIG. 6 of the drawings is obtained in which relation the critical fluid pressure $Ps$ increases at a rate greater than the rate of increase in the vehicle weight W when the vehicle weight increases. As a result, it is possible to make the characteristics of fluid pressure or braking force distribution close to the ideal characteristics curves $a_1$, $a_2$ of FIG. 1 in accordance with increases in the vehicle weight W.

In the event of the failure of the input fluid pressure $Pm$ in the first fluid circuit 16, since $PmA_2 = 0$ in the Eq. 2, the following equation is obtained:

$$Pr(A_1 - A_2) = Pm(A_1 - A_3) + F_1$$

Accordingly, the output fluid pressure $Pr$ is obtained as $$Pr = \frac{A_1 - A_3}{A_1 - A_2} Pm + \frac{F_1}{A_1 - A_2}$$
$$\frac{A_1 - A_3}{A_1 - A_2} = m' > m$$

In this instance, between the braking force B on the wheels and the input fluid pressure $Pm$ the following relation is provided: $B = C'Pm$ where $C' < C$. Hence, the force $F_1'$ of the spring 104 is expressed as $$F_1' = \frac{\frac{f(\theta)}{C}A_4W - (f_2 - \frac{K_2}{K_1}f_1)}{1 + \frac{K_2}{K_1}}$$

When the input fluid pressure P*m* is at a critical fluid pressure P*s'*, the following equation is defined:

$$Ps'(A_3 - A_2) = F_1'$$

Accordingly, the critical fluid pressure P*s'* is obtained as $$Ps' = \frac{\frac{f(\theta)}{C}A_4W - (f_2 - \frac{K_2}{K_1}f_1)}{(A_3 - A_2)(1 + \frac{K_2}{K_1})}$$

where $Ps' > Ps$.

Accordingly, it is apparent that the critical fluid pressure P*s'* is increased to a considerably high value which provides a braking force so great as to compensate the failure of the input fluid pressure P*m* in the first fluid circuit 16.

Support member 138 serves as the barrier means and prevents the flow of the fluid pressure P*m* from the inlet port 136 from striking the rear surface 146 of the ball member 122 and from exerting on the ball member 122 a thrust which moves the same toward the valve seat 124. Thus, ball member 122 does not impede the admission of the fluid pressure P*m* into the fluid chamber 108 to provide the forces of the springs 104 and 106. These forces are controlled by the fluid pressure P*m* through the piston 100 to a desired or predetermined value and the ball member 122 moves to the valve seat 124 in response to a desired or predetermined deceleration rate accurately to have the control device 24 perform its desired function or operation accurately.

It will be appreciated that the invention provides a braking pressure control device comprising support and baffle means for diverting the flow of the fluid pressure thereto to the periphery or edge thereof. The support and baffle means prevents the flow of the fluid pressure from striking the rear end of a ball valve. Thus, a thrust does not produce a bad influence upon the admission of the fluid pressure into a piston chamber nor hinder the ball valve moving to close an inlet port to the piston chamber in response to a predetermined deceleration rate. The control device also includes passage means for passing the diverted flow of the fluid pressure to the inlet port between the circumference or circumferential surroundings of the support and baffle means and the ball valve consequently the braking pressure control device exhibits its desired function completely or best.

The braking pressure control device has support and baffle means press fitted in a closure member for the rearward end of the device body to be integral with the closure member. Therefore its furnishing to the device body is easy as compared with a conventional ball support means held between a ball valve body and a closure member. The support and barrier means can be easily exchanged for a new one without removing the whole of the control device from the vehicle body or at a state in which the control device remains mounted on the vehicle body.

Although the invention has been described as being applied to a braking fluid pressure control device comprising a proportioning valve, the invention can be applied to a braking fluid pressure control device comprising a limiting valve in place of a proportioning valve.

What is claimed is:

1. A fluid pressure control device for a motor vehicle hydraulic braking system, said device comprising:
    a. a housing defining therein a first chamber into which an input fluid pressure is delivered through an inlet and a second chamber into which an output fluid pressure is generated and having an outlet for said output fluid pressure,
    b. a first valve movably located in said first and second chambers and having a first position in which an input fluid pressure is less than a critical fluid pressure and an output fluid pressure is equal to said input fluid pressure and a second position in which said input fluid pressure is greater than said critical fluid pressure and said output fluid pressure is less than said input fluid pressure,
    c. first valve control means comprising biasing means, first and second fluid chambers, a second valve, an end plug, and a valve supporter,
    d. said biasing means urging said first valve away from said first fluid chamber,
    e. said first fluid chamber being defined in said housing and receiving a second fluid pressure equal to said input fluid pressure for controlling the force of said biasing means,
    f. said second fluid chamber being defined in said housing and communicating with said first fluid chamber and having an open end,
    g. said second valve being disposed in said second fluid chamber and operable in response to a predetermined deceleration rate to separate said first fluid chamber from said second fluid chamber to maintain the pressure of fluid in said first fluid chamber at a predetermined value,
    h. said end plug being fixedly secured to said housing to close said open end and including a bore opening into said second fluid chamber,
    i. said end plug being formed therethrough with first passage means opening into said bore for conducting said second fluid pressure into said bore,
    j. said valve supporter being located in said bore of said end plug to support said second valve, and
    k. means for fixedly attaching said valve supporter to an internal wall of said bore unmovably relative to said end plug,
    l. said valve supporter lacking an aperture which penetrates said valve supporter and opens into said second fluid chamber from said valve supporter at a portion confronting said second valve,
    m. said valve supporter being formed outside said portion confronting said second valve with second passage means providing communication between said first passage means of said end plug and said second fluid chamber.

2. A fluid pressure control device for a motor vehicle hydraulic braking system, said device comprising:
    a. a housing defining therein a first chamber into which an input fluid pressure is delivered, and a second chamber into which an output fluid pressure is generated,
    b. a first valve movably located in said first and second chambers, c. said first valve having a first position in which said input fluid pressure is lower than a critical fluid pressure and said output fluid pressure is equal to said input fluid pressure, a second position in which said input fluid pressure is equal to said critical fluid pressure, and a third position in which said input fluid pressure is higher than said critical fluid pressure and said output fluid pressure is less than said input fluid pressure, d. first valve control means including biasing means, a first fluid chamber and a piston, e. said first fluid chamber being defined in said housing and into which a second fluid pressure equal to said input fluid pressure is delivered, f. said piston being slidably fitted in said first fluid chamber and urged by the pressure of fluid in said first fluid chamber to control the force of said biasing means, g. said biasing means being located between said first valve and said piston to urge them in opposite directions, h. said control means further including, a second fluid chamber, a second valve, and end plug and a valve supporter, i. said second fluid chamber defined in said housing and communicating with said first fluid chamber and having an open end, j. said second valve being disposed in said second fluid chamber and operable in response to a predetermined deceleration rate to separate said first and second fluid chambers from each other to maintain the pressure of fluid in said first fluid chamber at a predetermined value, k. said end plug being fixedly secured to said housing to close said open end and formed with a bore opening into said second fluid chamber, l. said end plug being formed therethrough with first passage means opening into said bore for conducting said second fluid pressure into said bore, m. said valve supporter being located in said bore of said end plug to support said second valve, and n. means for fixedly attaching said valve supporter to an internal wall of said bore unmovably relative to said end plug, o. said valve supporter lacking an aperture which penetrates said valve supporter and opens into said second fluid chamber from said valve supporter at a portion confronting said second valve, p. said valve supporter being formed outside said portion confronting said second valve with second passage means providing communication between said first passage means of said end plug and said second fluid chamber.

3. A fluid pressure control device as claimed in claim 2, in which
said valve supporter comprises a disk member, and said second passage means of said valve supporter comprises a plurality of grooves formed in its peripheral portion.

4. A fluid pressure control device as claimed in claim 2, in which
said second valve comprises a ball.

5. A hydraulic braking system for a motor vehicle, comprising:
a. a master cylinder of a tandem type,
b. front wheel cylinders,
c. rear wheel cylinders,
d. a fluid pressure control device including a housing, a first valve, and first valve control means,
e. said housing defining therein a first chamber into which an input fluid pressure is delivered, and a second chamber into which an output fluid pressure is generated,
f. said first valve movably located in said first and second chambers,
g. said first valve having a first position in which said input fluid pressure is lower than a critical fluid pressure and said output fluid pressure is equal to said input fluid pressure, a second position in which said input fluid pressure is equal to said critical fluid pressure, and a third position in which said input fluid pressure is higher than said critical fluid pressure and said output fluid pressure is less than said input fluid pressure,
h. said first valve control means including biasing means, a first fluid chamber and a piston,
i. said first fluid chamber being defined in said housing and into which a second fluid pressure equal to said input fluid pressure is delivered,
j. said piston being slidably fitted in said first fluid chamber and urged by the pressure of fluid in said first fluid chamber to control the force of said biasing means,
k. said biasing means being located between said first valve and said piston to urge them in opposite directions,
l. said control means further including, a second fluid chamber, a second valve, an end plug and a valve supporter,
m. said second fluid chamber defined in said housing and communicating with said first fluid chamber and having an open end,
n. said second valve being disposed in said second fluid chamber and operable in response to a predetermined deceleration rate to separate said first and second fluid chambers from each other to maintain the pressure of fluid in said first fluid chamber at a predetermined value,
o. said end plug being fixedly secured to said housing to close said open end and formed with a bore opening into said second fluid chamber,
p. said end plug being formed therethrough with first passage means opening into said bore for conducting said second fluid pressure into said bore,
q. said valve supporter being located in said bore of said end plug to support said second valve, and
r. means for fixedly attaching said valve supporter to an internal wall of said bore unmovably relative to said end plug,
s. said valve supporter lacking an aperture which penetrates said valve supporter and opens into said second fluid chamber from said valve supporter at a portion confronting said second valve,
t. said valve supporter being formed outside said portion confronting said second valve with second passage means providing communication between said first passage means of said end plug and said second fluid chamber,
u. said fluid pressure control device further comprising bore means defining a control bore which adjoins said second chamber and is separated from said second chamber, a front braking circuit leading from said master cylinder and communicating with said front wheel cylinders and with said control bore of said control device, and v. a rear braking circuit leading from said master cylinder and communicating with said first chamber of said control device and with said first passage means of said end plug, w. said second chamber of said control device communicating with said rear wheel cylinders, x. said first valve having an extension which extends from said second chamber into said control bore and on which a fluid pressure from said master cylinder acts to urge said first valve toward said biasing means.

* * * * *